(12) United States Patent  
Chen

(10) Patent No.: US 9,430,143 B2  
(45) Date of Patent: Aug. 30, 2016

(54) SCREEN CAPTURING METHOD AND ELECTRONIC DEVICE USING THE SAME

(71) Applicant: ASUSTeK COMPUTER INC., Taipei (TW)

(72) Inventor: Yu-Ying Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 18 days.

(21) Appl. No.: 14/546,578

(22) Filed: Nov. 18, 2014

(65) Prior Publication Data

US 2015/0145794 A1    May 28, 2015

(30) Foreign Application Priority Data

Nov. 25, 2013   (CN) .......................... 2013 1 0601581

(51) Int. Cl.
G06F 3/0488        (2013.01)
(52) U.S. Cl.
CPC ................................ G06F 3/04883 (2013.01)
(58) Field of Classification Search
CPC .......... G06F 3/0484–3/048545; G06F 17/24; G06T 1/0007
See application file for complete search history.

(56) References Cited

U.S. PATENT DOCUMENTS

| 2011/0022991 | A1 | 1/2011 | Hillis et al. |
| 2014/0168267 | A1* | 6/2014 | Kim ........................ G06F 3/017 345/633 |
| 2015/0022432 | A1* | 1/2015 | Stewart ............... G06F 3/04842 345/156 |
| 2015/0026620 | A1* | 1/2015 | Kwon ................ G06F 3/04845 715/770 |

FOREIGN PATENT DOCUMENTS

| CN | 102880287 A | 1/2013 |
| CN | 103037102 A | 4/2013 |

* cited by examiner

*Primary Examiner* — Liliana Cerullo  
(74) *Attorney, Agent, or Firm* — Muncy, Geissler, Olds & Lowe PC

(57) ABSTRACT

A screen capturing method and an electronic device using the same are provided. The screen capturing method includes that a continuous track is inputted. The continuous track includes a first stroke and a second stroke, and a first recording point is captured at a first moment of the first stroke, a second recording point is captured at a second moment of the second stroke. The first recording point includes a first velocity, and the second recording point includes a second velocity. The first velocity and the second velocity form an angle. A capturing box of a preset shape is enabled when the strokes meet the determining condition. An image is captured via the capturing box.

10 Claims, 4 Drawing Sheets

SCREEN CAPTURING METHOD AND ELECTRONIC DEVICE USING THE SAME

CROSS REFERENCE TO RELATED APPLICATIONS

This application claims the priority benefit of CN application serial No. 201310601581.X, filed on Nov. 25, 2013. The entirety of the above-mentioned patent application is hereby incorporated by reference herein and made a part of specification.

BACKGROUND OF THE INVENTION

1. Field of Invention

The invention relates to a screen capturing method and, more particularly to a screen capturing method of which a capturing box can automatically enable according to a determining condition and an electronic device using the same.

2. Description of the Related Art

As development of computer science, the image capturing technology is wildly used in different electronic devices. Conventionally, the image capturing method mainly includes a user-defined captured area (using a free curve) or a preset captured box (such as a rectangle) to complete the capturing.

However, regardless of the capturing modes, a user needs to select among multiple options or predefine a hotkey to enable the capture function. For example, the capture function is enabled when an image key or a physical button of the electronic device is selected. The switching mode and the position of the switch key of the different screen capturing software are various. Therefore, the user needs to learn and remember them, which is inconvenient.

BRIEF SUMMARY OF THE INVENTION

A method of switching a screen capturing mode by inputting a gesture and an electronic device using the same are provided. Within the method, switching the screen capturing mode manually is not required.

A screen capturing method includes the following steps that a continuous track is inputted. The continuous track includes a first stroke and a second stroke, and a first recording point is captured at a first moment of the first stroke, a second recording point is captured at a second moment of the second stroke. The first recording point includes a first velocity, and the second recording point includes a second velocity. The first velocity and the second velocity form an angle. Whether the strokes meet a determining condition is determined, and the determining condition at least includes that the angle is in a preset angle range and a time interval between the first moment and the second moment is less than a preset time. A capturing box of a preset shape is enabled when the first stroke and the second stroke meet the determining condition. An image is captured via the capturing box.

An electronic device including a display, an input device and a processor is provided. The input device can input a continuous track, and the continuous track includes a first stroke and a second stroke. The processor captures a first recording point at a first moment of the first stroke and captures a second recording point at a second moment of the second stroke. The first recording point includes a first velocity, and the second recording point includes a second velocity. The first velocity and the second velocity form an angle. When the angle is in a preset angle range and a time interval between the first moment and the second moment is less than a preset time, a capturing box of a preset shape is enabled. An image is captured via the capturing box.

Two recording points in the two strokes of the continuous track are captured, and the screen capturing mode is switched to the mode using the preset capturing box by determining whether the two recording points meet the preset determining condition, so as to switch the screen capturing mode by inputting a gesture rather than switch the screen capturing mode manually.

DETAILED DESCRIPTION OF THE EMBODIMENT

A screen capturing method is illustrated with relating drawing, and the same number denotes the same component. Some indirectly related components are not shown for a concise purpose.

Figure 1:
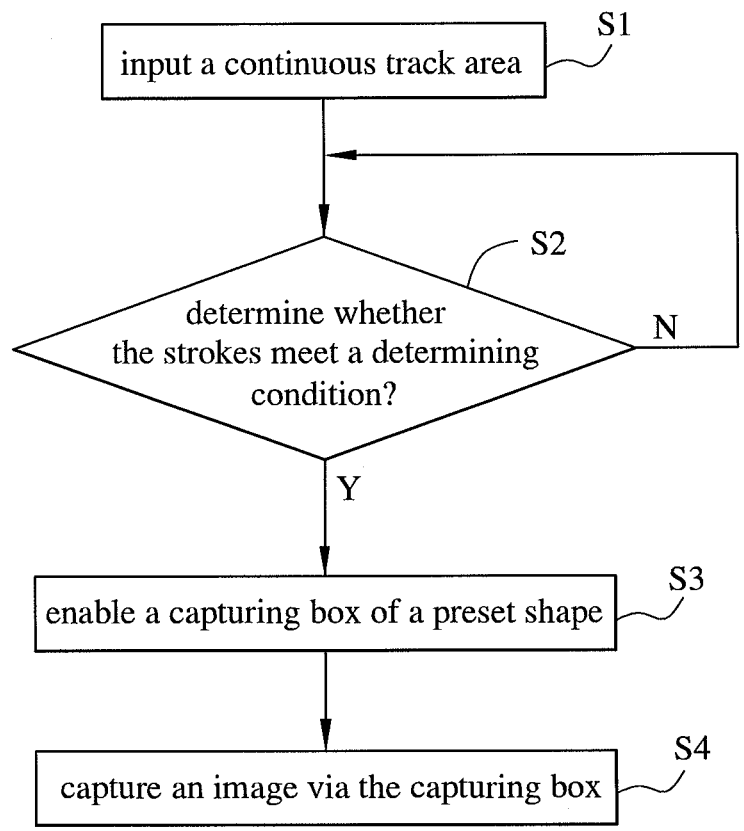
FIG. 1 is a flowchart showing a screen capturing method in an embodiment of the invention.
Figure 2:
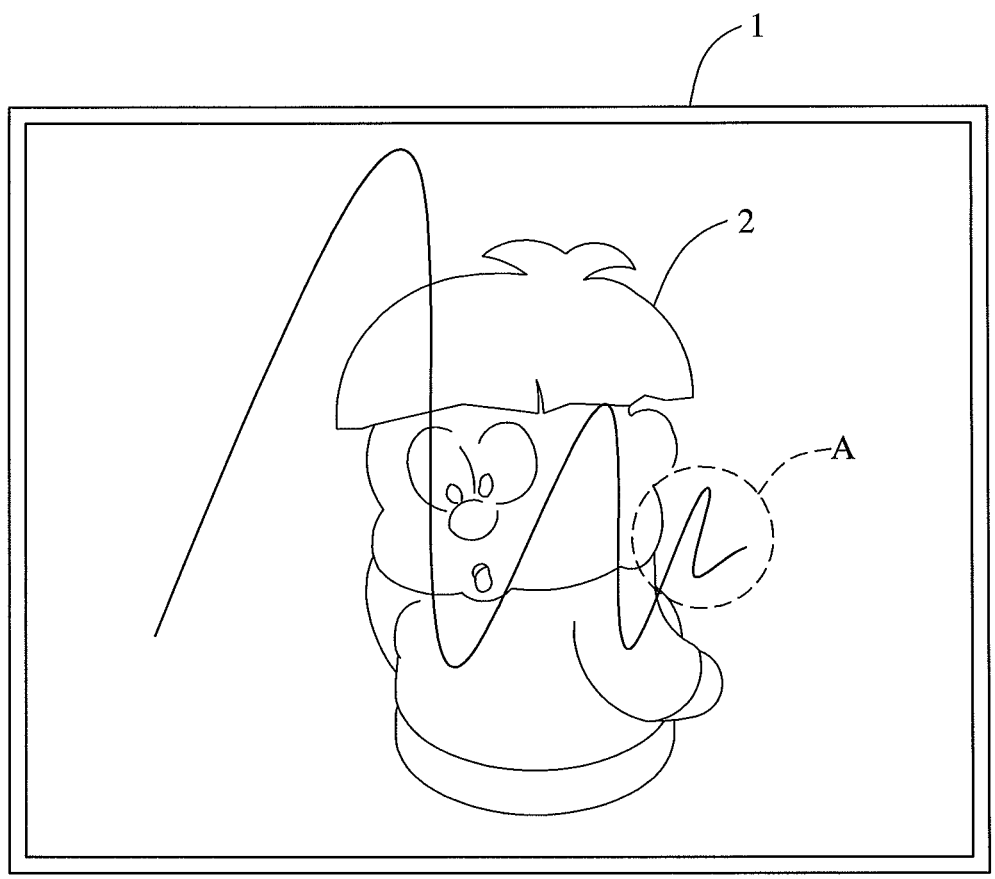
FIG. 2 is a schematic diagram showing an operation of a screen capturing mode in the first embodiment.
Figure 3:
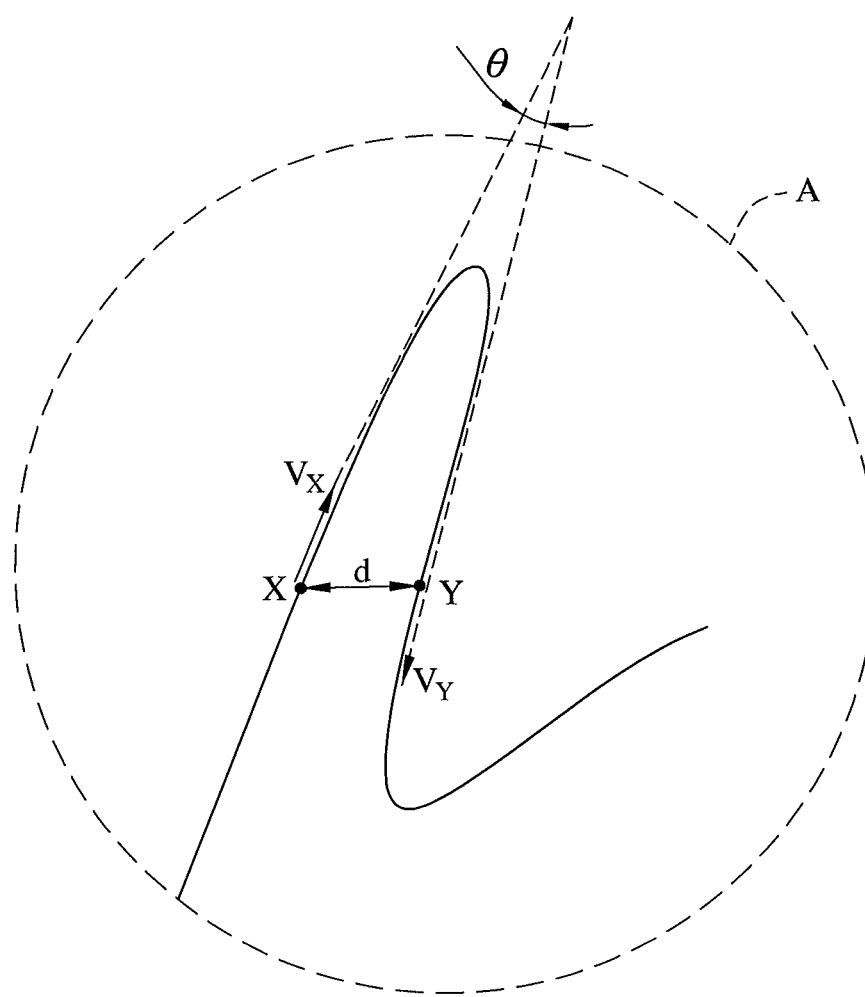
FIG. 3 is a partial enlargement diagram of FIG. 2.
Figure 4:
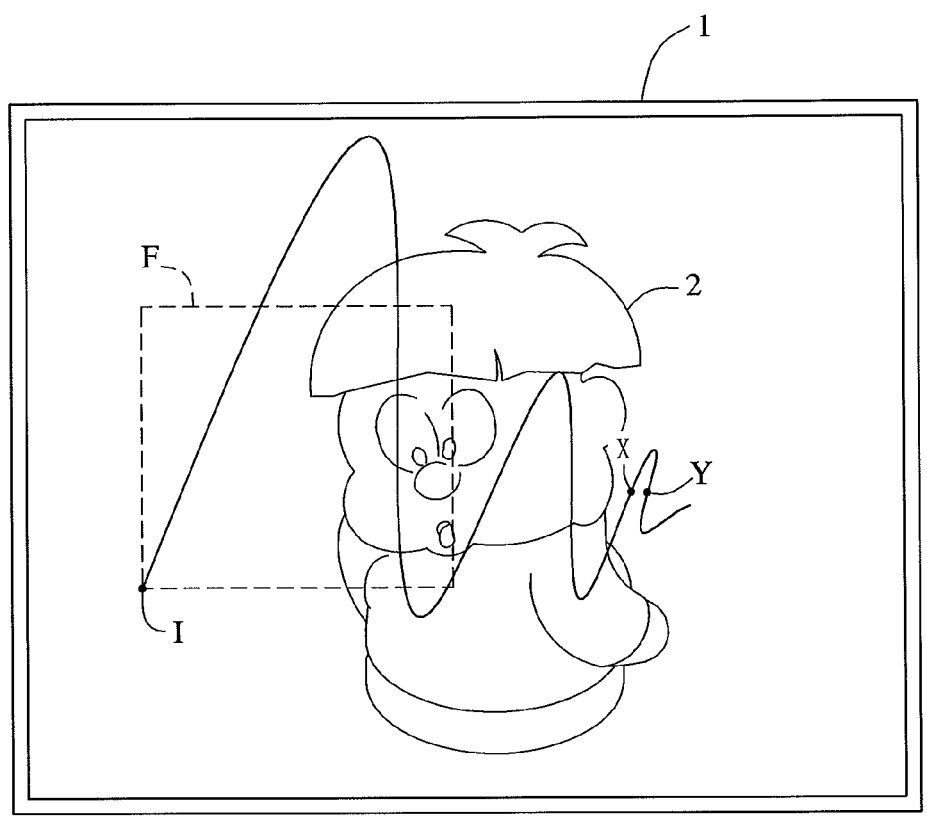
FIG. 4 is a schematic diagram showing an operation of a screen capturing mode in another embodiment.

Please refer to FIG. 1 to FIG. 4. FIG. 1 is a flowchart showing a screen capturing method in an embodiment of the invention. FIG. 2 and FIG. 4 are schematic diagrams showing an operation of a screen capturing mode in the first embodiment. FIG. 3 is a partial enlargement diagram of FIG. 2.

A screen capturing method is provided in the embodiment, which can be applied to a display 1, and the display 1 at least includes an image 2. In the embodiment, the screen capturing method includes the following steps that a continuous track is inputted, and the continuous track includes a first stroke and a second stroke (step S1). When the screen capturing method is applied to an electronic device, the continuous track is a track inputted by a cursor or a touchpad. The "stroke" defined herein can be one of the strokes as shown in FIG. 2.

In the screen capturing method, all inputted strokes are captured, and all the recording points of the strokes can be further captured. In addition, multiply strokes of the continuous tracks are defined according to the velocity of drawing adjacent recording points, if the velocity of the one of the recording points is below a preset value, such as zero, the recording points is determined as a stroke (in the embodiment, seven strokes are shown in FIG. 2).

FIG. 3 is an enlargement diagram showing a dashed box A of FIG. 2. In the embodiment, the continuous track includes a first stroke and a second stroke. A first recording point X is captured at a first moment of the first stroke, and a second recording point Y is captured at a second moment of the second stroke.

The first recording point X includes a first velocity $V_X$, and the second recording point Y includes a second velocity $V_Y$. The first velocity $V_X$ and the second velocity $V_Y$ form an angle θ.

Additionally, in the embodiment, the first recording point X is the recording point of the first stroke in a maximal velocity value, and the second recording point Y is the recording point of the second stroke in a maximal velocity value. The first moment is the time point of recording the first recording point, the second moment is the time point of recording the second recording point.

The angle θ between the first velocity $V_X$ and the second velocity $V_Y$ is formed by crossing the extending line of the first velocity $V_X$ and the extending line of the second velocity $V_Y$.

Whether the strokes meet the determining condition is determined (step S2), the determining condition at least includes that the angle is in a preset angle range, and a time interval between the first moment and the second moment is less than a preset time, the preset time is preferably between 0 s and 0.3 s.

When the strokes meet the determining condition, the capturing box F of a preset shape is enabled (step S3). An image is captured via the capturing box F (step S4). Otherwise, the strokes are continuously detected.

In detail, in the embodiment, the preset angle range is between 0° and 10°, and the preset time is between 0 s and 0.3 s as an example. When the detected angel θ between the first velocity $V_X$ and the second velocity $V_Y$ is 9°, and the time interval between the first moment and the second moment is 0.1 s, in this case, it can be determined that the two strokes meet the determining condition, and thus the screen capturing mode is switched to the mode using the preset the capturing box (please refer to FIG. 4).

In addition, the preset the capturing box may be a circle, a rectangle, a polygon, which is not limited herein. In the embodiment, a preset starting point of the preset capturing box disposes at an initial point of the continuous track. In other words, when the mode using the preset capturing box is switched and determined, the image is selected from the initial point I of the continuous track directly. If the preset capturing box F is a rectangle, the initial point I of the continuous track is the starting point of the capturing box F. If the preset capturing box F is a circle, the initial point I of the continuous track is the initial point, and the circle can be zoomed in or zoomed out. In the embodiment, the initial point I is defined as the starting point of the capturing box F, however, the first recording point X, the second recording point Y or other user-defined positions can also be defined as the initial point of the capturing box, which is not limited herein.

Moreover, except for the two above determining conditions, in the embodiment, the determining condition further includes that a distance between the first recording point X and the second recording point Y is less than a preset distance. Thus, when the preset distance between the first recording point X and the second recording point Y is between 0 cm and 0.5 cm, the preset angle range is between 0° and 10°, and the preset time is between 0 s and 0.3 s (three determining conditions are met simultaneously), in this case, it can be determined that the two strokes meet the determining condition, and thus the screen capturing mode is switched to the mode using the preset capturing box.

The screen capturing method can be applied to an electronic device, such as a notebook computer, a mobile phone, a tablet computer, a desktop computer, which is not limited herein.

The electronic device at least includes a display an input device and a processor. The input device can be varies which depends on the type of electronic devices, for example, the input device of the notebook computer is a touchpad, a mouse, which is not limited herein. In an embodiment, when the display of the electronic device is a touch screen, the input device and the display are coupled together.

Similarly, a continuous track is inputted via the input device, and the continuous track includes a first stroke and a second stroke. The processor captures the first recording point X at a first moment of the first stroke and captures the second recording point Y at a second moment of the second stroke. The first recording point includes the first velocity $V_X$, and the second recording point Y includes the second velocity $V_Y$. The first velocity $V_X$ and the second velocity $V_Y$ form an angle θ.

Moreover, when the angle θ is in a preset angle range, and a time interval between the first moment and the second moment is less than a preset time, a capturing box F of a preset shape is enabled, and an image of the display is captured via the capturing box F.

Other steps are similar to the above embodiment, which is omitted herein.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A screen capturing method, comprising:
   inputting a continuous track, wherein the continuous track includes a first stroke and a second stroke, a first recording point is captured at a first moment of the first stroke, a second recording point is captured at a second moment of the second stroke, and the first recording point includes a first velocity, the second recording point includes a second velocity, and the first velocity and the second velocity form an angle;
   determining whether the strokes meet a determining condition, wherein the determining condition includes the angle is in a preset angle range, and a time interval between the first moment and the second moment is less than a preset time;
   enabling a capturing box of a preset shape when the strokes meet the determining condition; and
   capturing an image via the capturing box.

2. The method according to claim 1, wherein the determining condition further includes that a distance between the first recording point and the second recording point is less than a preset distance.

3. The method according to claim 1, wherein the preset angle range is between 0° and 10°.

4. The method according to claim 1, wherein the preset time is between 0 s and 0.3 s.

5. The method according to claim 2, wherein the preset distance is between 0 cm and 0.5 cm.

6. An electronic device, comprising:
   a display;
   an input device, for receiving an inputted continuous track, where the continuous track includes a first stroke and a second stroke; and
   a processor, for capturing a first recording point at a first moment of the first stroke and captures a second recording point at a second moment of the second stroke and, the first recording point includes a first velocity, the second recording point includes a second velocity, and the first velocity and the second velocity forms an angle;
   wherein when the angle is in a preset angle range, and a time interval between the first moment and the second moment is less than a preset time, a capturing box of a preset shape is enabled and an image of the display is captured via the capturing box.

7. The electronic device according to claim 6, wherein when a distance between the first recording point and the second recording point is less than a preset distance, the capturing box of the preset shape is enabled.

8. The electronic device according to claim 6, wherein the preset angle range is between 0° and 10°.

9. The electronic device according to claim 6, wherein the preset time is between 0 s and 0.3 s.

10. The electronic device according to claim 7, wherein the preset distance is between 0 cm and 0.5 cm.

* * * * *